June 11, 1935.  J. M. NICKELSEN  2,004,380
DIRECT ACTING SHOCK ABSORBER
Filed Jan. 22, 1934
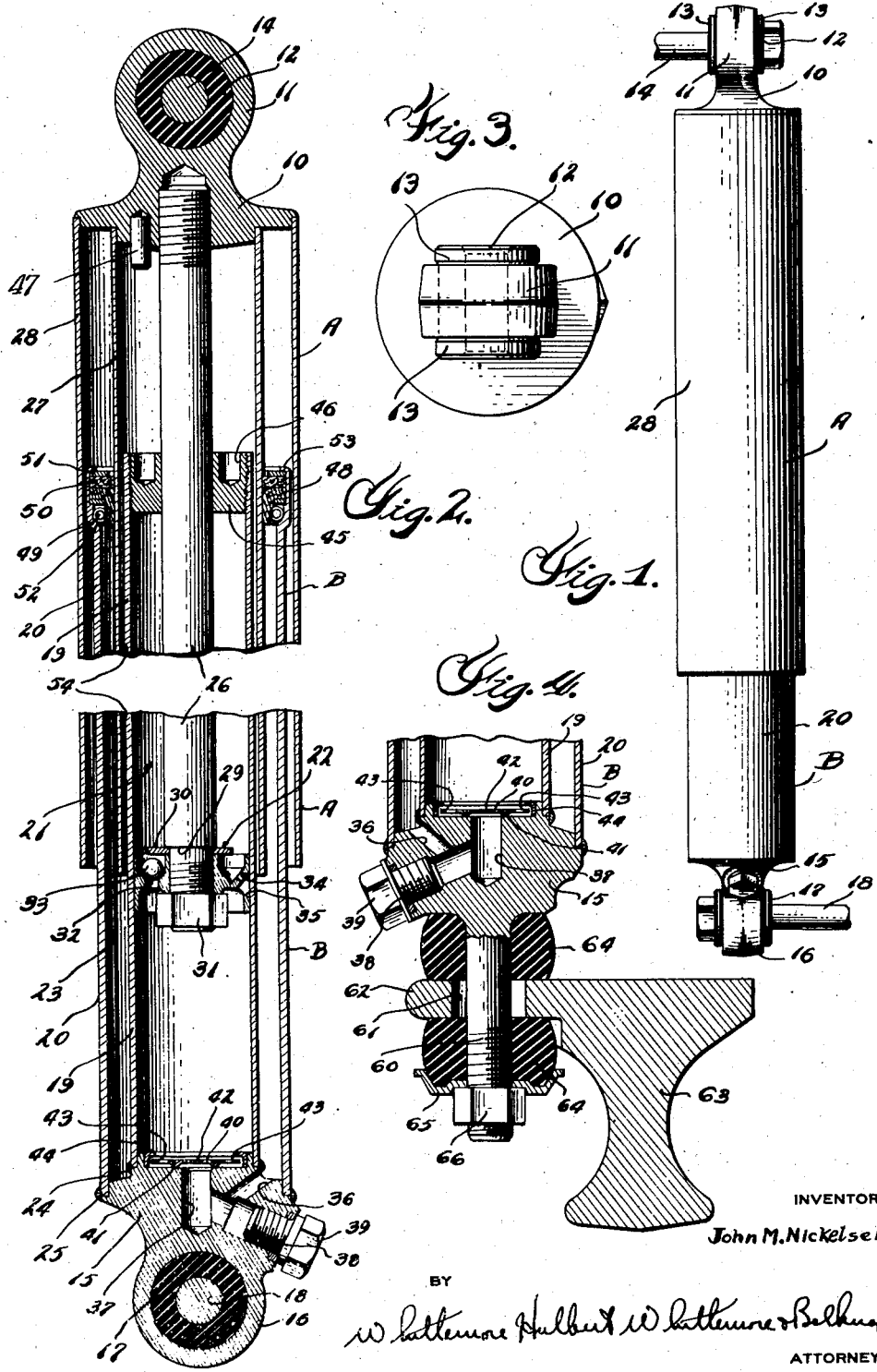
INVENTOR
John M. Nickelsen
BY
ATTORNEYS Patented June 11, 1935

2,004,380

UNITED STATES PATENT OFFICE 2,004,380

DIRECT ACTING SHOCK ABSORBER

John M. Nickelsen, Ann Arbor, Mich., assignor to Monroe Auto Equipment Company, Monroe, Mich., a corporation of Michigan Application January 22, 1934, Serial No. 707,824

16 Claims. (Cl. 188—88)

This invention relates to shock absorbers, and more particularly to improvements in hydraulic shock absorbers of the direct acting type, and has as its objects to simplify, render more efficient, and improve generally devices of this character.

One of the important objects of this invention is to provide a hydraulic shock absorber of this type in which the necessity for packing to prevent leaking around the piston rod is eliminated, the oil seal between the telescoping sections of the device being arranged exteriorly of the main pressure cylinder.

Another object of the invention is to provide a device of this character which will check or retard the movement of the relatively movable parts of an automobile body to which the device is attached, in both directions, the greater or dominating retardation being effective, however, in but one direction.

Another object of the invention is to provide a shock absorber of this character, the construction and arrangement of the parts of which provides for facile assembly and disassembly.

Still another object of this invention is to provide a hydraulic shock absorber of this characted having a filling opening so arranged and located that the introduction of the proper amount of hydraulic medium is facilitated.

The several objects, advantages and novel details of construction of the invention will be made more apparent as this description proceeds, especially when considered in connection with the accompanying drawing, wherein Figure 1 is an elevational view of my improved shock absorber;

Figure 2 is an enlarged fragmentary longitudinal sectional view taken at right angles to Figure 1;

Figure 3 is an end elevational view, and

Figure 4 is a fragmentary sectional view showing a modified form of attaching means.

Referring now more particularly to the drawing, wherein like reference characters indicate like parts, it will be noted that the shock absorber comprises two telescoping sections A and B adapted to be directly connected respectively to two relatively movable parts of a vehicle, for instance. The head or end 10 of the section A is provided with an eye 11 in which a bushing or grommet 12 of rubber or other compressible material is located. This bushing is provided with end flanges 13 engaging opposite faces of the eye 11 to locate and hold the bushing in place. This end of the shock absorber may be connected to one of the relatively movable parts by means, for instance, of a bolt 14 passed longitudinally through the rubber bushing. The compressibility of the bushing provides a limited amount of flexibility in the connection to take care of relative lateral angular movement of the shock absorber due to the side-sway of the vehicle. The other head or end member 15 is provided with a similar eye 16 in which is located a rubber grommet 17 similar to the rubber grommet 12, a bolt 18 being shown as the means for attaching this end of the shock absorber to the other relatively movable part.

In Figure 4, a modified form of attaching means is shown. In this form, a bolt 60 is formed integrally with the head 15 and is adapted to pass freely through an aperture 61 in a lateral extension 62 formed either integral with the axle 63 as shown, or secured thereto in any preferred manner. Surrounding the bolt 60 on both sides of the extension 62 are blocks 64 formed of rubber or some other compressible material.

One of the blocks is confined between the head 15 and the extension 62 and the other block is held against the extension 62 by means of a cap or washer 65 mounted on the bolt and held in place by a nut 66.

The aperture 61 is larger than the diameter of the bolt and permits angular movement of the bolt and shock absorber, which movement however is resiliently restrained by the blocks 64. This type of construction may be applied to either or both ends of the shock absorber.

Secured to the head 15 are a pair of concentric tubular members 19 and 20. The inner tubular member provides a pressure cylinder 21 in which a piston 22 operates and the other tubular member 20 provides a reserve chamber 23 adapted to contain a reserve supply of hydraulic medium in addition to that in the pressure cylinder 21. The inner tubular member 19 is welded to, or otherwise integrated with, the head 15 as at 24, whereas the outer tubular member is similarly attached thereto, as at 25, thus providing fluid tight joints between these tubular members and the head or end member 15.

The piston 22 is carried on the end of a piston rod 26 which is carried by the head or end member 10. As apparent, the piston 22 is adapted to reciprocate in the pressure cylinder 21 as the heads 10 and 15 move toward and away from one another due to relative movement of the relatively movable parts to which the shock absorber is connected.

Attached to and suspended from the head 10 is a sealing tube 27, this sealing tube being adapted to telescope between the concentric tubes 19 and 20. Also attached to and suspended from the head 10 is a tubular dust shield 28 which is adapted to protect the working cylinders from dust and dirt. These tubular members 27 and 28 are preferably connected to the head by welding, although attachment may be made thereto in any other suitable manner.

The end of the piston rod 26 on which the piston 22 is mounted is reduced to provide a shoulder 29 against which a washer 30 mounted on the reduced end, abuts. The piston 22 is then mounted on the reduced piston rod end and the assembly is secured in place by means of a nut 31 threaded on the threaded extremity of the piston rod.

The piston is provided with one or more relatively large apertures 32 therethrough adapted to be closed when the piston moves in one direction by means of ball check valves 33. The washer 30 is employed to hold the ball checks assembled with the piston end to limit movement of the ball check valves in one direction.

The piston 22 is also provided with an angularly arranged relatively small orifice 34 through which the oil is forced when the piston moves upwardly and the balls 33 are seated. The orifice 34 is preferably arranged at an angle as illustrated, and the skirt of the piston is preferably cut away adjacent thereto, as indicated at 35 so that the oil is directed through the piston in such a manner as to impinge against the adjacent wall of the cylinder 19 before passing to the other side of the piston. This acts to minimize the noise resulting from the forcible movement of the oil through the orifice.

The lower end of the pressure cylinder 21 communicates with the reserve reservoir 23 by means of communicating passageways 36 and 37 formed in the head 15. Also communicating with this passageway 36—37 is a filler opening 38 adapted to be closed by a closure plug 39 threaded thereinto.

The passage of oil or hydraulic medium from the pressure cylinder 21 to the reserve chamber 23 is controlled by means of a check valve in the form of a disk-like flapper valve 40. This flapper valve is provided with a depending annular bead 41 which seats on the head 15 around the periphery of the opening 37 and thus prevents the flow of oil from the pressure cylinder 21 to the reserve chamber 23 except for a small orifice 42 formed in the flapper valve. When, however, the flapper valve is raised from its seat, oil is permitted to flow freely through the orifice 37 and to the pressure cylinder through a plurality of large openings 43 formed in the flapper valve. The reference character 44 indicates a cage for the flapper valve which cage is pressed into place.

Threaded into the upper end of the tubular member 19 which forms the pressure cylinder 21 is a bushing 45. This bushing substantially closes the upper end of the pressure cylinder and provides a guide for the piston rod 26 although no effort is made to seal the opening through which the piston rod 26 passes. The bushing 45 is preferably provided with a plurality of openings 46 in the upper face thereof adapted during assembly and disassembly to be engaged by a dowel pin 47 projecting from the inner face of the head 10. Thus in assembly or disassembly the two shock absorber sections may be telescoped until the dowel pin 47 engages one of the openings 46 whereupon relative rotation of the shock absorber sections will permit the bushing to be threadedly engaged or disengaged with the end of the pressure cylinder, as will be apparent. This obviously facilitates the assembling or disassembling of the device because when the bushing 45 has been removed the upper section, including the piston rod and piston, sealing tube 27 and dust skirt or guard 28, may be separated from the remainder of the device.

The device is sealed by a sealing assembly carried by the end of the tubular member 20 for engaging the sealing tube 27. This sealing ring assembly comprises an annular leather washer 48 which is held in engagement with the sealing tube 27 by means of an annular coil spring 49. Above the leather washer is a felt washer 50, and on top of the felt washer is a steel washer 51. To accommodate the assembly, the end of the tubular member 20 is provided with an increased diameter thus forming a shoulder 52, and the end of the tubular member 21 is rolled over, as at 53, into engagement with the washer 51 thus holding the assembly against the shoulder 52.

It will be noticed that the outer surface of the tubular member 19 is spaced slightly from the inner surface of the sealing tube 27 to provide a space 54 therebetween which space provides communication between the space beyond the upper end of the pressure cylinder 21 beyond the bushing 45 and the reserve chamber 23. Thus any oil that leaks past the bushing 45 around the piston rod 26 will be returned to the reserve chamber 23 through this space 54.

In charging the device with oil or other hydraulic medium, the shock absorber is inverted to position the filler opening 38 at the top. With the filler plug 39 removed, oil is introduced into the filler opening 38 and flows into the pressure cylinder 21 through the passage 37 and also into the reserve chamber 23 through the passage 36. Such air as is in the pressure cylinder and reserve chamber is of course trapped therein, and when the level of the oil reaches the filler opening, both the pressure cylinder and the reserve chamber have been supplied with the correct amount of oil, and the shock absorber is ready for installation and use.

In operation, when the piston 22 travels downwardly, that is when the heads 10 and 15 move toward one another, the pressure of the oil below the piston unseats the ball check valves 33 and the oil is permitted to flow freely around these ball checks from the lower end of the pressure cylinder 21 toward the upper end thereof. During this movement, the flapper valve 40 seats, and any excess oil in the lower end of the pressure cylinder escapes through the small orifice 42 through the passage 37—36 to the reserve reservoir 23. On the return movement, that is when the piston is moving upwardly (as viewed in Figure 2), the ball check valves 33 seat, and the oil can pass from the upper end of the pressure cylinder 21 through the piston 22 to the lower end of the pressure cylinder only through the relatively restricted orifice 34. This orifice is of such size as to give the desired amount of resistance suitable for the particular shock absorber unit in question, and of course may be varied in size in accordance with the demands made upon the shock absorber. Thus the upward movement of the piston is retarded in dependence upon the size of this orifice, and during this upward movement of the piston the flapper valve 40 is raised from its seat so the oil may flow freely from the reserve reservoir 23 through the passage 36—37 and into the lower end of the pressure cylinder 21.

Thus it will be seen that the movement of the piston 22 in either direction causes a slight surge of the oil in and out of the reserve chamber 23 dependent upon the volume of piston rod 26 as it passes in and out of the working chamber.

As heretofore indicated, such oil as may leak around the piston through the bushing 45 will flow back through the passage 54 and into the reserve reservoir 23. However, the upper end of the reserve reservoir 23 is adequately sealed by the sealing ring assembly which engages the sealing tube 27 so that all liability of leakage at this point is adequately prevented. Moreover, the level of the oil in the normal operation of the device never reaches the sealing ring assembly.

Thus the device is adequately sealed against leakage without requiring packing around the piston rod where the prevention of leakage is more difficult. As heretofore pointed out, the tubular member 27 is welded or has some other leak-proof connection with the head 10, and the tubular members 19 and 20 are similarly connected to the head 15 so that possibility of leakage at these joints is provided against.

The dust shield 28 acts to prevent dust and dirt from contacting the working cylinders, and otherwise acts to protect the same.

While the embodiment of the invention herein illustrated and described somewhat in detail has been found in practice to give entirely satisfactory results, nevertheless various changes and modifications may suggest themselves to those skilled in this art, and to this end reservation is made to make such changes as may come within the purview of the accompanying claims.

What I claim as my invention is:

1. In a hydraulic shock absorber of the class described, a pair of concentric spaced tubular members the inner of which forms a fluid pressure cylinder and the outer of which forms a fluid reserve chamber, a tubular member telescoping between said spaced tubular members, a piston carried with said last mentioned member and reciprocating in said pressure cylinder, and a seal between said outer tubular member and said last named tubular member, for the purpose set forth.

2. In a hydraulic shock absorber of the class described, a pair of concentric spaced tubular members closed at their lower ends and forming an inner fluid pressure cylinder and an outer fluid reserve chamber, a sealing tube closed at its upper end and telescoping between said spaced tubular members, a piston movable with said sealing tube and working in said pressure cylinder, and a sealing ring assembly carried by the outer tubular member of said spaced tubular members and engaging said sealing tube, for the purpose set forth.

3. In a shock absorber of the class described, a pair of concentric spaced tubular members closed at their lower ends and forming an inner pressure cylinder and an outer reserve chamber, a sealing tube closed at its upper end and telescoping between said spaced tubular members, a valved piston movable with said sealing tube and working in said pressure cylinder, means providing communication between said pressure cylinder and said reserve chamber, and a sealing ring assembly carried by the outer tubular member of said spaced tubular members and engaging said sealing tube, for the purpose set forth.

4. In a shock absorber of the class described, a pair of concentric spaced tubular members closed at their lower ends and forming an inner pressure cylinder and an outer reserve chamber, a sealing tube closed at its upper end and telescoping between said spaced tubular members, a piston movable with said sealing tube and working in said pressure cylinder, means carried by said piston permitting the relatively free flow of fluid through said piston when said piston moves in one direction and for restricting the flow of fluid through said piston when the piston moves in the opposite direction, means for establishing communication between the lower ends of said pressure cylinder and reserve chamber, and a sealing ring assembly carried by the outer tubular member of said spaced tubular members and engaging said sealing tube, for the purpose set forth.

5. In a shock absorber of the class described, a pair of concentric spaced tubular members closed at their lower ends and forming an inner pressure cylinder and an outer reserve chamber, a sealing tube closed at its upper end and telescoping between said spaced tubular members, a piston movable with said sealing tube and working in said pressure cylinder, means forming a port connecting the lower end of said pressure cylinder with said reserve chamber, and a check valve associated with said port for permitting the free flow of fluid from said reserve chamber to said pressure cylinder when said piston moves in one direction and for restricting the flow of fluid from said pressure cylinder to said reserve chamber when the piston moves in the opposite direction.

6. In a shock absorber of the class described, a pair of concentric spaced tubular members closed at their lower ends and forming an inner pressure cylinder and an outer reserve chamber, a sealing tube closed at its upper end and telescoping between said spaced tubular members, a piston movable with said sealing tube and working in said pressure cylinder, means carried by said piston permitting the relatively free flow of fluid through said piston when said piston moves in one direction and for restricting the flow of fluid through said piston when the piston moves in the opposite direction, a passage connecting said pressure cylinder to said reserve chamber, and a check valve associated with said passage for permitting the free flow of fluid from said reserve chamber to said pressure cylinder when said piston moves in one direction and for restricting the flow of fluid from said pressure cylinder to said reserve chamber when the piston moves in the oposite direction.

7. In a shock absorber of the class described, a pair of concentric spaced tubular members closed at their lower ends and forming an inner pressure cylinder and an outer reserve chamber, a sealing tube closed at its upper end and telescoping between said spaced tubular members, a piston movable with said sealing tube and working in said pressure cylinder, means carried by said piston for permitting the relatively free flow of fluid therethrough when said piston moves downwardly, and for restricting the flow of fluid therethrough when said piston moves upwardly, a passage connecting the lower end of said pressure cylinder with said reserve chamber, and a check valve associated with said passage acting to restrict the flow of fluid from said pressure cylinder to said reserve chamber when said piston moves downwardly and for permitting the free flow of fluid from said reserve chamber to said pressure cylinder when said piston moves upwardly.

8. In a hydraulic shock absorber for vehicles, a pair of upper and lower heads adapted to be connected directly to two relatively movable parts of the vehicle, a pair of concentric spaced tubular members carried by said lower head and having their lower ends closed thereby, the inner tubular member forming a pressure cylinder and the outer tubular member forming a reserve chamber, means formed in said lower head for establishing comunication between said pressure cylinder and reserve chamber, a tubular member carried by said upper head and having its upper end closed thereby, said last named tubular member constituting a sealing tube and telescoping between said spaced tubular members, a piston working in said pressure cylinder, a piston rod connecting said piston to said upper head, and a fluid seal carried by the outer of said spaced tubular members and engaging said sealing tube for sealing the upper end of said reserve chamber, for the purpose set forth.

9. In a hydraulic shock absorber for vehicles, a pair of upper and lower heads adapted to be connected directly to two relatively movable parts of the vehicle, a pair of concentric spaced tubular members carried by said lower head and having their lower ends closed thereby, the inner tubular member forming a pressure cylinder and the outer tubular member forming a reserve chamber, means formed in said lower head for establishing communication between said pressure cylinder and reserve chamber, a tubular member carried by said upper head and having its upper end closed thereby, said last named tubular member constituting a sealing tube and telescoping between said spaced tubular members, a piston working in said pressure cylinder, a piston rod connecting said piston to said upper head, a fluid seal carried by the outer of said spaced tubular members and engaging said sealing tube for sealing the upper end of said reserve chamber, and a dust shield carried by said upper head and substantially enclosing said aforementioned tubular members.

10. In a hydraulic shock absorber for vehicles, upper and lower heads adapted to be directly connected to relatively movable parts of the vehicle, a pair of spaced concentric tubular members carried by said lower head and forming an inner pressure cylinder and an outer reserve chamber, a piston rod secured to said upper head and provided with a piston working in said pressure cylinder, a bushing detachably secured in the upper end of said pressure cylinder through which said piston rod slides, and means on said upper head engageable with said bushing for assembling and disassembling said bushing with respect to said pressure cylinder.

11. In a hydraulic shock absorber for vehicles, upper and lower heads adapted to be directly connected to relatively movable parts of the vehicle, a pair of spaced concentric tubular members carried by said lower head and forming an inner pressure cylinder and an outer reserve chamber, a piston rod secured to said upper head and provided with a piston working in said pressure cylinder, a bushing having a threaded engagement with the upper end of said pressure cylinder and provided with an opening therethrough through which said piston rod slides, a recess formed in the face of said bushing opposite said upper head, and a projection carried by said upper head engageable with said recess for assembling and disassembling said bushing with said pressure cylinder.

12. In a hydraulic shock absorber of the class described, upper and lower heads, a pair of concentric spaced tubular members carried by said lower head and forming an inner pressure cylinder and an outer reserve chamber, a piston rod secured to said upper head and provided at its lower end with a piston working in said pressure cylinder, a sealing tube carried by said upper head and telescoping in the space between said spaced tubular members, means cooperating with said tube for sealing the upper end of said reserve chamber, a passage in said lower head providing communication between said pressure cylinder and reserve chamber, and a filling opening in said lower head communicating with said passage, for the purpose set forth.

13. In a hydraulic shock absorber for vehicles, upper and lower heads adapted to be connected to relatively movable parts of the vehicle, a pair of tubular members carried by said lower head and forming a fluid pressure cylinder and a fluid reserve chamber, a piston rod secured to said upper head and provided with a piston working in said pressure cylinder, a piston guiding member detachably secured in the upper end of said pressure cylinder through which said piston rod slides, and means on said upper head engageable with said piston guiding member for assembling and disassembling said piston guiding member with respect to said pressure cylinder.

14. In a hydraulic shock absorber for vehicles, a pair of heads adapted to be connected respectively to relatively movable parts of the vehicle, a pair of tubular members carried by one of said heads and forming a fluid pressure cylinder and a fluid reserve chamber, a piston rod secured to the second of said heads and provided with a piston working in said pressure cylinder, a member detachably secured in the end of said piston cylinder through which said piston rod slides, and means on said second head engageable with said member for assembling and disassembling said member with respect to said pressure cylinder.

15. In a hydraulic shock absorber for vehicles, a pair of heads adapted to be connected respectively to relatively movable parts of a vehicle, a pair of tubular members engaging one of the heads and extending toward the other of the heads, a piston rod secured to the second named head and provided with a piston working in one of the tubular members, a member detachably secured to the end of one of the tubular members adjacent the second named head and forming a guide for the piston rod, and means on the second named head engageable with said member for assembling and disassembling the member with respect to said last mentioned tubular member.

16. In a hydraulic shock absorber for vehicles, upper and lower heads adapted to be connected to relatively movable parts of the vehicle, a pair of tubular members carried by said lower head and forming a fluid pressure cylinder and a fluid reserve chamber, a piston rod secured to the upper head and provided with a piston working in the pressure cylinder, a piston guiding member detachably secured to the upper end of one of the tubular members, and means on the upper head engageable with the piston guiding member for assembling and disassembling said piston guiding member with respect to the last named tubular member.

JOHN M. NICKELSEN.